(12) United States Patent  (10) Patent No.: US 7,802,068 B2
Madison, Jr. et al.  (45) Date of Patent: Sep. 21, 2010

(54) SELF-ORGANIZING HETEROGENEOUS DISTRIBUTED STORAGE SYSTEM

(75) Inventors: Carl T. Madison, Jr., Windsor, CO (US); Charles R. Martin, Louisville, CO (US)

(73) Assignee: Oracle America, Inc., Redwood City, CA (US)

( * ) Notice: Subject to any disclaimer, the term of this patent is extended or adjusted under 35 U.S.C. 154(b) by 312 days.

(21) Appl. No.: 11/864,463

(22) Filed: Sep. 28, 2007

(65) Prior Publication Data

US 2009/0089521 A1  Apr. 2, 2009

(51) Int. Cl.
*G06F 12/00* (2006.01)
(52) U.S. Cl. ...................................................... 711/162
(58) Field of Classification Search .................. 711/162
See application file for complete search history.

(56) References Cited

U.S. PATENT DOCUMENTS 6,639,900 B1 * 10/2003 Anstey et al. ................ 370/254
2006/0282697 A1 * 12/2006 Sim-Tang ....................... 714/1

* cited by examiner

*Primary Examiner*—Mardochee Chery
(74) *Attorney, Agent, or Firm*—Marsh Fischmann & Breyfogle LLP; Kent A. Lembke; Jon P. Deppe

(57) ABSTRACT

The state of a computing environment is captured and heterogeneously stored on a network using self-organizing data portions. Altered portions of data of a captured computing state are replicated a plurality of times and each are embedded with a rule set that governs the distribution of the data. The rule set of each portion directs that data portion to relocate itself and remain as distant as possible from other replicated copies of that particular captured state and stored on a heterogeneous storage medium. Simultaneously, data portions that are associated with a similar file or other data structure are directed to maintain proximity with each other within a replicated copy forming a self-organized distribution of data portions.

20 Claims, 5 Drawing Sheets

SELF-ORGANIZING HETEROGENEOUS DISTRIBUTED STORAGE SYSTEM

BACKGROUND OF THE INVENTION

1. Field of the Invention

Embodiments of the present invention relate, in general, to storage of computer data and particularly to systems and methods for self-organizing distributed heterogeneous storage of computer data.

2. Relevant Background

Computer data increasingly permeates almost every aspect of day-to-day life. As the world transitions to a more and more digital environment, there exists along with that transition a requirement that the data be reliable, efficient and preserved. File cabinets filled with volumes of paper documents are being replaced by disks and tapes holding the repository of digital information. As the computing environment becomes more mobile and the volume of data more substantial, a dilemma is created between the need to maintain a reliable and efficient means to store data and the ability for one or more users to access that data anywhere in the world Storing data on a distributed network is well known in the art. Storage area networks ("SAN") represent one approach to store vast amounts of data on multiple nodes coupled together to form a network. Users access the network to retrieve and store data relieving the need to maintain a large local storage capacity. SANs however are typically dedicated resources optimized for the storage of data. This specialization comes at the cost of access time depending on the locality of the user. Local users would typically find latency issues with respect to data access insignificant while users at more distant or remote locations would experience significant and often unacceptable delays. And while portions of the SAN may be local to any one user, the data that the user seeks is not necessarily stored in that local component.

Reliability of the data is also of significant concern with respect to data storage. Backing up or replicating data to promote the data's reliably is well known. Techniques to replicate and store data vary from copying and storing at a different location an entire image of a system to snapshots of a particular operating environment to copy-on-write technology. These and other techniques however fail to address a user who is in Seattle one week, Paris the next and Hong Kong shortly thereafter. Such a user would experience a wide variance in the ability to access and store data.

SUMMARY OF THE INVENTION

Briefly stated, embodiments of the present invention involve systems and method for the distributed storing and accessing of data portions on heterogeneous storage media on a network. More particularly embodiments of the present invention describe self-organizing data portions that, once introduced to a network environment, locate themselves throughout heterogeneous storage media in the network so as to provide reliable data storage and efficient data access.

According to one embodiment of the present invention, the state of a computing environment is captured and stored on a network. The state that is captured, represented by a plurality of data portions, is replicated a plurality of times and distributed throughout the network. Each data portion representing the captured and replicated data possesses a rule set that governs the distribution of the data. For purposes of the present invention the state of a computing environment includes both data content and metadata regarding that content. A change in the state can be indicative of a change in the content and/or the metadata. As will be understood by one skilled in the relevant art, metadata includes information about the data such as edit time, duration, user information, change statistics and the like. A data portion is a segment of a piece of data. The term portion is not intended, nor does it, refer to any specific structure or data architecture.

In one embodiment of the present invention the rule set of each portion directs that data portion to relocate itself and remain as distant as possible from other replicated copies of that particular data portion. By maximizing such dispersion, the reliability of each replicated data portion is enhanced. Furthermore the dispersion is enhanced by utilization of heterogeneous storage media on which to store the portions. Simultaneously, data portions that are associated with a similar file or other data structures, are directed to maintain proximity with each other within a replicated copy. Thus subsets of data portions self-organize themselves throughout the network to achieve both maximum dispersion from other replicated copies while at the same time maintaining proximity to other data portions within a particular replicated copy that possesses a similar data structure.

As one skilled in the art will appreciate, the rule set possessed by each data portion can be modified based on the data structure association desired and the degree of dispersion throughout the network for purposes of enhanced reliability of the data.

Another aspect of the present invention includes the repositioning of replicated data portions distributed throughout the network upon a node seeking access to the stored data. So as to promote efficiency of access, the replicated data portion or portions that the node is seeking to access is repositioned so as to be at a location as close as possible to the requesting device. Once relocated to this now local storage location, the remaining replicated data portions automatically relocate themselves within the network to once again maximize separation from the newly relocated local storage location.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of an embodiment taken in conjunction with the accompanying drawings, wherein.

Figure 1:
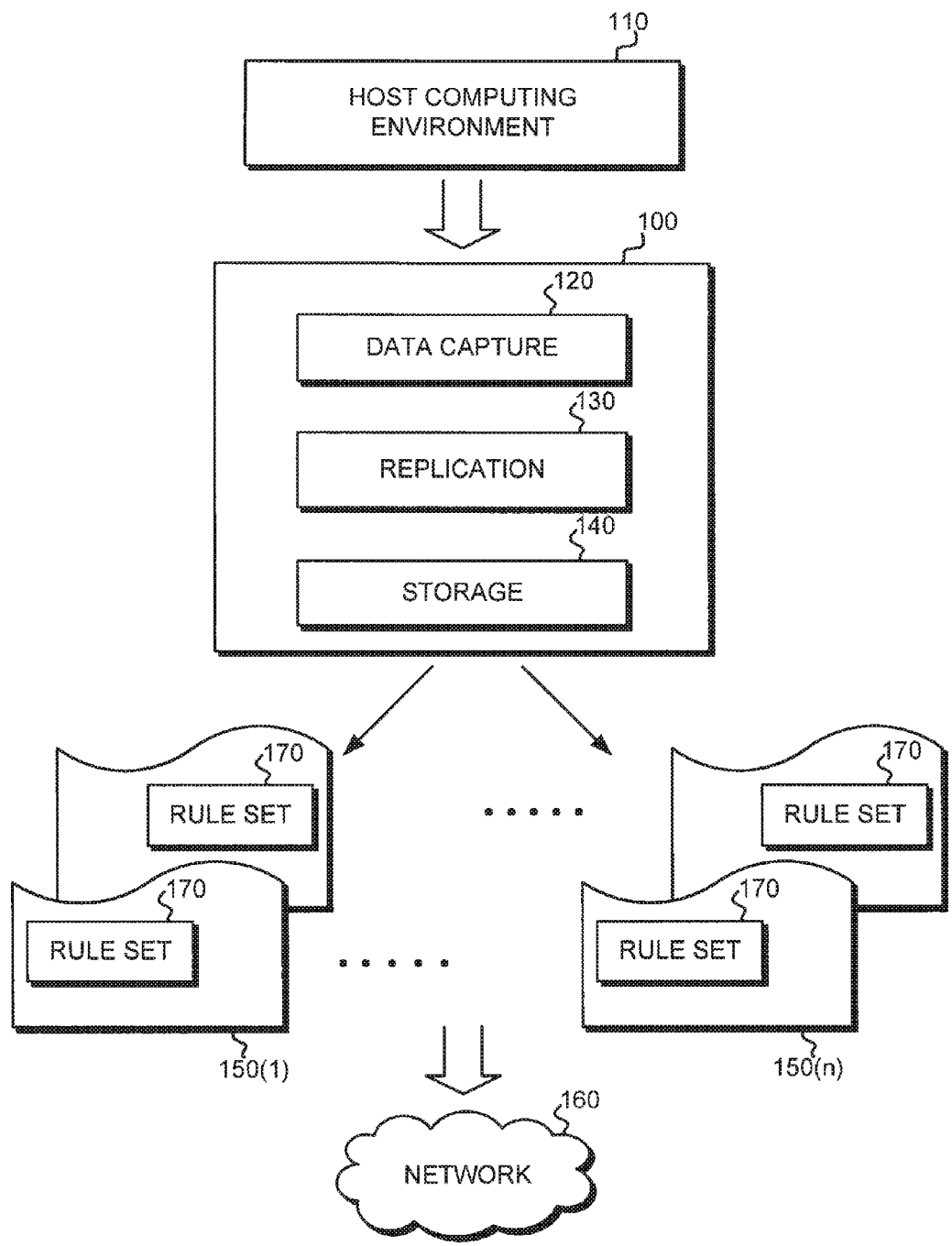
FIG. 1 shows a high level portion diagram of a system for a self-organizing heterogeneous distributed storage system for computer data, according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Specific embodiments of the present invention are hereafter described in detail with reference to the accompanying figures. Like elements in the various figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

Embodiments of the present invention capture data portions of a computing environment that are then replicated and distributed throughout a network for storage on heterogeneous storage media. According to one embodiment of the present invention, alterations to a computing environment are recognized, captured, replicated and thereafter distributed amongst various nodes of a network. The replicated portions of data self-organize themselves to simultaneously maximize the distance between other identical replicated portions while at the same time are associated with and remain proximal with other data portion of a similar data structure.

FIG. 1 is a high level portion diagram depicting one embodiment of the present invention for self-organized data portion replication on a distributed network. A system 100 for data portion replication and distribution is interposed between a host 110 computing environment and a network 160. The host 110 can be any computing device including a personal computer, network portal, personal data assistant, network terminal and the like. The host 110 is a device in which a user can access, manipulate/view and store data.

Similarly the network 160 is any network of computing devices, including but not limited to, Local Area Networks ("LANs"), Wide Area Networks ("WANs"), Ethernet networks, token rings, the Internet, Intranets and the like. While connections between the nodes in these network and the host are for discussion purposes described as a wired connection, the present invention is equally applicable to a wireless connection established under 802.11, wireless mesh networks, and WiFi and other network infrastructures.

With reference to FIG. 1, the system 100 includes, in one embodiment of the present invention, three modules. A capture module 120, a replication module 130 and a storage module 140, together and working in conjunction with one another recognize alterations in a computing environment and act to capture, replicate and store the data associated with these changes on the network 160.

The system 100 can, in one embodiment of the present invention, reside on the host 110 where the data alterations take place, interposed between the host 110 and the network 160 as shown in FIG. 1, or on another node within the network 160. Indeed the modules themselves may be distributed throughout the network to accommodate a more efficient working solution.

According to one embodiment of the present invention, a user operating on a host computing device modifies or alters a computing environment. The modification may be of a specific data structure such as a data file or data execution file or may be of a organizational scheme. For example, a user may access and modify a word processing document while at the same time modify a calendar event. Both applications, the word processing application and the calendaring application represent the user's computing environment, yet the data portions within the two different applications are unique and heterogeneous.

Periodically and/or as set by predetermined rules, the capture module 120 of the system 100 recognizes that the computing environment has been altered. In one embodiment of the present invention, the capture module retains the last known captured environment locally, and then periodically compares the present state to the most recent captured state. When the states have been significantly altered based on pre-established criteria, the capture module 120 captures a new computing state. The new captured state then replaces the old states for purposes of comparison. Other techniques, known to one skilled in the art, can be employed to determine when a new state should be captured without departing from the intent and value of the present invention.

Another function of the capture module, according to one embodiment of the present invention, is to identify which portions of data are to be replicated. The state represents a snapshot of the computing environment at a moment in time. While initially the entire state of the computing environment must be captured and saved, thereafter such a replication would be inefficient. Therefore, at either predetermined intervals or when the amount of alterations exceed a predetermined level, the state of the computing environment is temporarily captured and examined. In most instances, the majority of the computing state and the data associated with that state remains unchanged from one capture point to the next. It would therefore be inefficient to replicate and store the entire state each time the state is captured, when only a small portion has been changed.

The capture module 120 identifies to the replication module 130 what portions of the temporally captured state are to be replicated. The replication order can, however, span a wide variety of data types. For example, in the previous scenario, the capture module 120, after capturing the state of the computing environment, determined that certain data portions within a word processing data file and certain data portions within the calendar structure have been altered and should be replicated. The remaining, unchanged, data portions stored in temporary storage on the local host 110 can be released.

According to one embodiment of the present invention, the replication module 130, having received from the data capture module what data portions should be copied, replicates these data portions a plurality of times. Each replication is an identical copy of the computing state captured by the capture module 120. Thereafter, the several copies of the data portions are conveyed to the storage module 140.

The storage module 140, according to one embodiment of the present invention, imbeds within each data portion, a rule set 170 directing the distribution of each replicated data portion throughout the network 160. The rule set 170 is maintained within each data portion (in the metadata or a similar data portion structure) making the data portions within the network self-organizing. As shown in FIG. 1, the system 100 captured altered data, replicated the data and imbedded the data with rule, so as to produce a plurality of sets of replicated data portions 150. Each data portion with each set of data portions 150$_{1...n}$ possess rules that drive identical copies of the data to repel from each other.

Simultaneously, an additional rule within each data portion drives data portions of similar data structure to remain in proximity of one another. In this manner, replicated subsets of similar data portions move within the network so as to maximize separation from each other. The separation inherently enhances the reliability of the storage. A set of data portions stored on a node of the network in Australia are less likely to be impacted by a network failure and data loss incident in New York.

Figure 2:
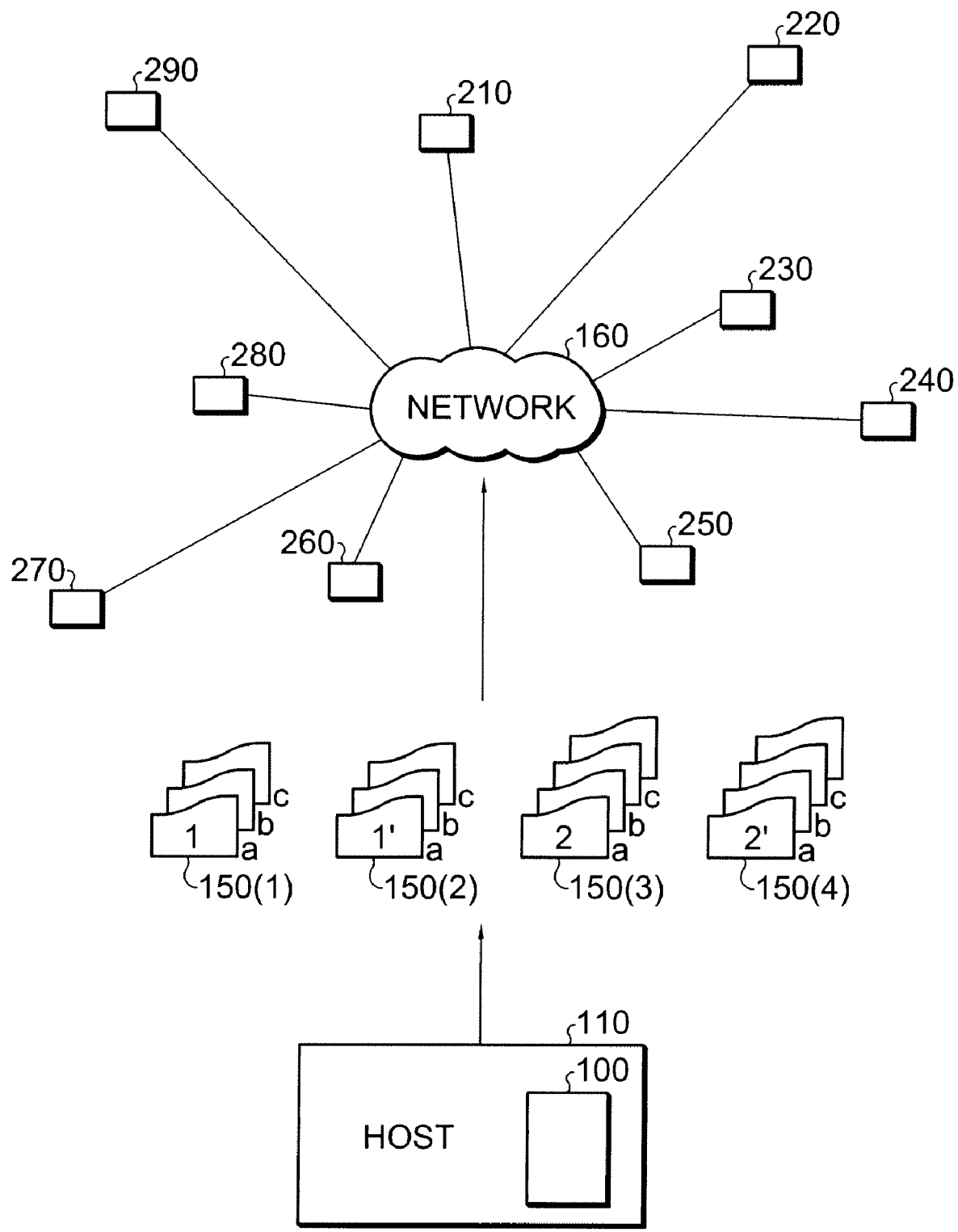
FIG. 2 shows a high level view of a network environment interacting with a plurality of replicated data portions according to one embodiment of the present invention.

FIG. 2 is a high level portion diagram depicting the distribution of a plurality of data portions. In this particular example, the system 100 residing on the host 110, identifies two sets of altered data portions. Each set of data is replicated twice producing two identical copies each. As shown in FIG. 2, these copies of data portions are labeled 1 150$_1$, and 1' 150$_2$ and 2 150$_3$ and 2' 150$_4$. Each one of these four copies possesses the same time stamp associating the replication with a particular computing state.

Also shown in FIG. 2 is a plurality of nodes 210, 220, 230, 240, 250, 260, 270, 280, 290 within the network. The orientation of these nodes is intended to graphically show the relative proximity of one node to another. One skilled in the art will recognize that proximity of one node to another relies on a multitude of factors. Nodes that are geographically near each other may be with respect to the network very distant while nodes some distance apart may, due to the type of connection and other characteristics, very close. Furthermore, the present invention utilizes heterogeneous storage media for the storage of the replicated portions of data. To enhance the reliability of the storage and retrieval of the data portions, replicated data portions are, according to one embodiment of the present invention, directed to heterogeneous storage media so that each replicated portion is not found on the same type of storage medium. The present invention contemplates these and other criteria in determining how each data portion will organize itself with respect to other data portions within the network 160.

In addition for purposes of the embodiment shown in FIG. 2, the host 110, once having introduced the replicated portions of data to the network, is no longer connected to the network and thus does not influence their distribution. As described later, continued access by a host may shift the distribution of data portions. The capture module 120 of the system 100, in this example, identified and replicated three portions of data of type 1 and four portions of data for data type 2.

Figure 3:
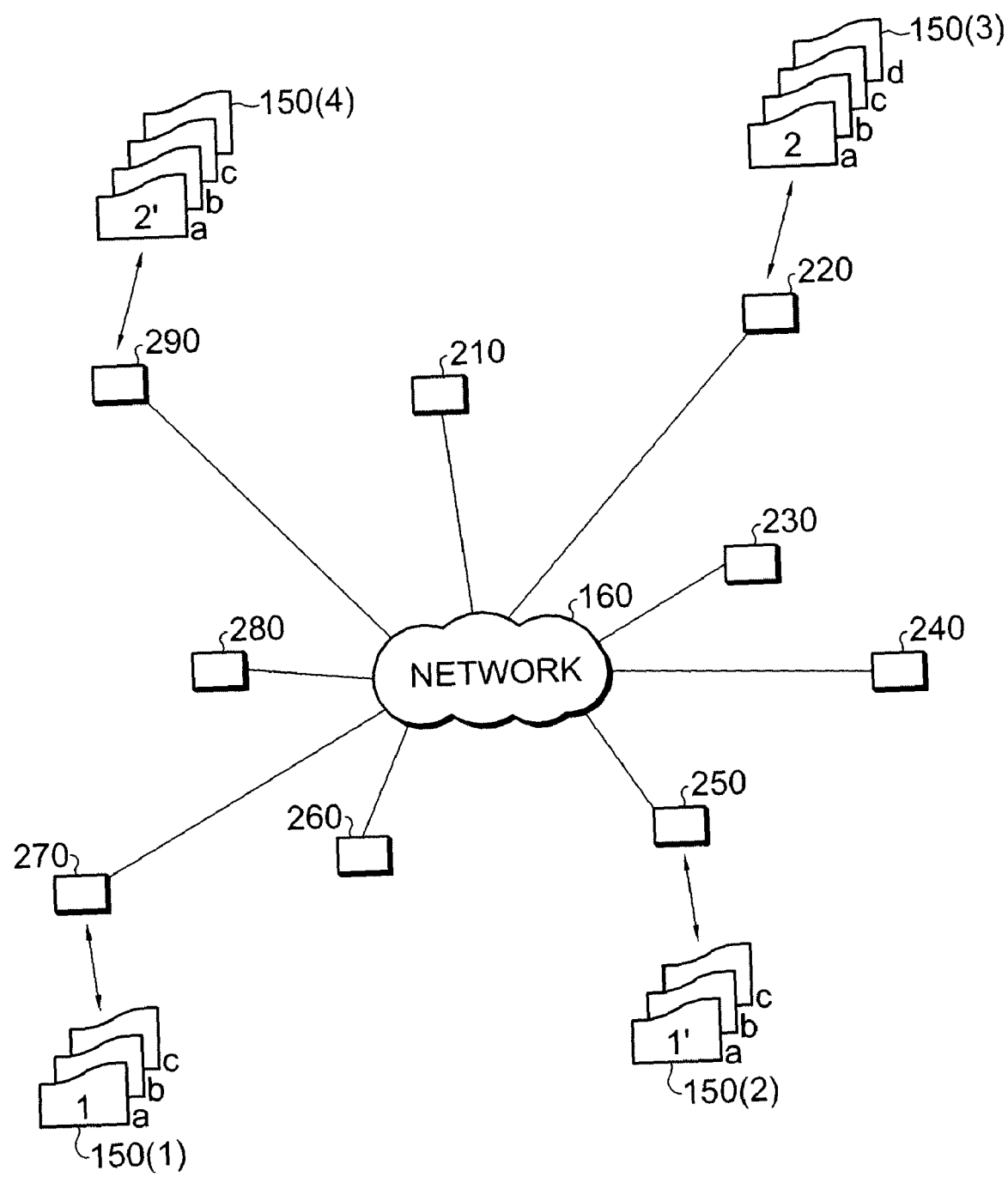
FIG. 3 is a high level view of a network environment in which, according to one embodiment of the present invention, replicated copies of subsets of data portions are dispersed throughout the network.

Turning now in addition to FIG. 3 and according to one embodiment of the present invention, the replicated portions of data 150 distribute themselves throughout the network 160 based on the rule set 170 embedded within each data portion. While each portion organizes itself individually, the rule set 170 maintains an association amongst related portions. In this example, alteration in the word processing document are captured in the replicated data portions of 1 150$_1$ and 1' 150$_2$. Each replicated copy possesses three data portions, a, b, and c. The rule set embedded in each of these portions direct the portion to remain proximal to the other associated portions and distant from other portions possessing the same time stamp.

Thus data portions 1a, 1b, and 1c will attempt to remain proximal to each other and yet as a group attempt to achieve maximal separation from portions 1'a, 1'b, and 1'c as well as all of 2 150$_3$ and 2'150$_4$.

Similarly, altered data portions associated with the calendaring program 2 150$_3$ and 2' 150$_4$ are driven to stay proximal within each data structure. Therefore the four portions 2a, 2b, 2c, and 2d remain proximal to one another yet are driven away from data portions 1 150$_1$, 1' 150$_2$ and 2' 150$_4$. As shown in FIG. 3, these subsets of associated data portions automatically locate themselves across the network at dispersed locations 220, 250, 270, 290.

Figure 4:
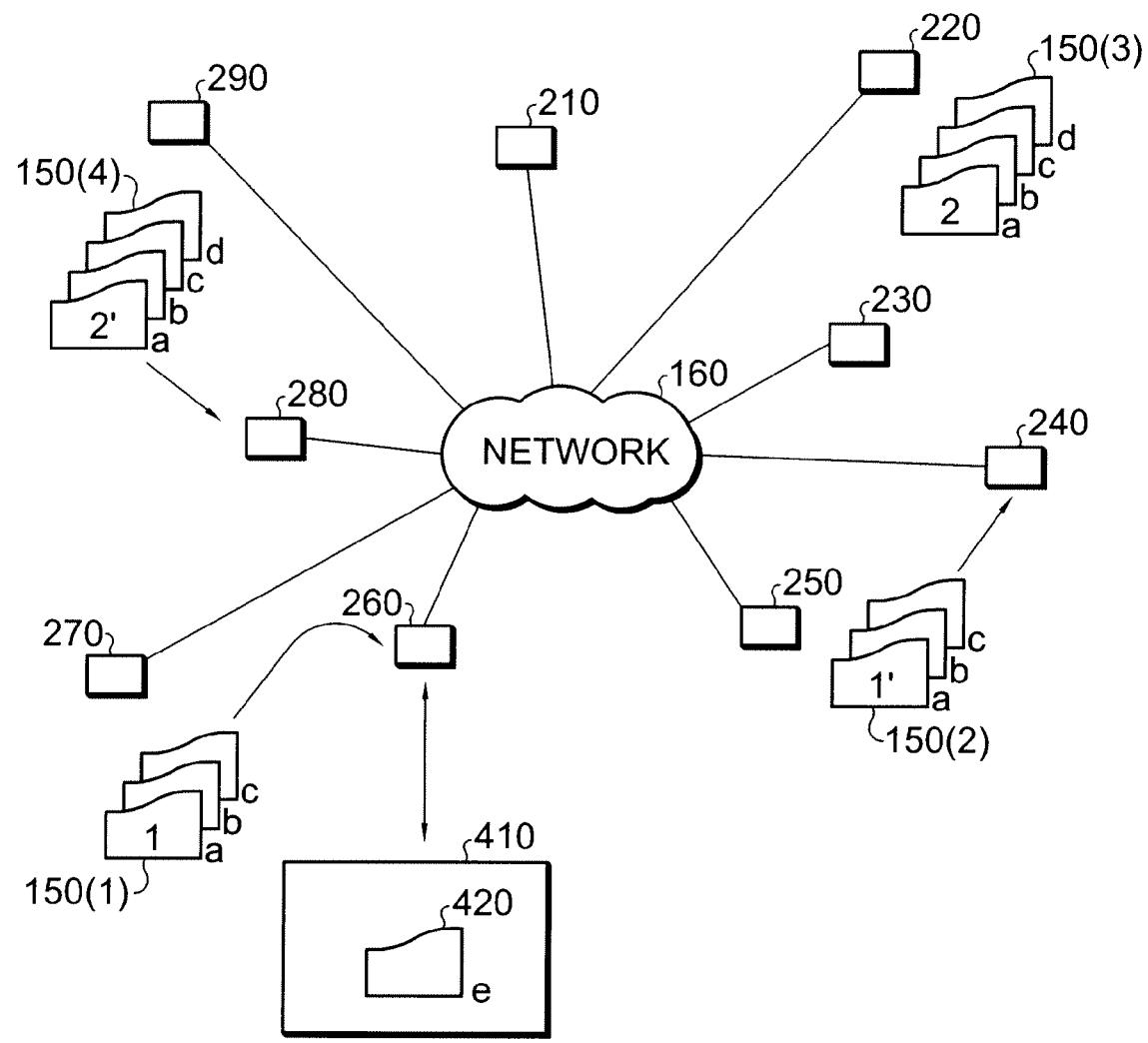
FIG. 4 is a high level view of the network shown in FIG. 3 showing, according to one embodiment of the present invention, a redistribution of replicated copies of subsets of data portions due to an access request made by a host.

According to another embodiment of the present invention, and with further reference to FIG. 4, these dispersed subsets of data portions, relocate themselves upon a request of access so as to be local to the requesting host. FIG. 4 shows the network environment of FIGS. 2 and 3 with the added introduction of a new requesting host 410. According to one embodiment of the present invention, a host 410 couples with the network 160 and seeks access to one or more network stored portions of data. The host 410 sends a request to the network for access to data having a particular type of data structure, having a particular time stamp of a particular computing environment. Using these criteria, the data portions matching the request relocate themselves to the closest node capable of storing the data.

Continuing with the previous example, a host 410 accesses the network 160 seeking to access and thereafter modify the previous changes to the word processing document stored on the network. These changes were stored on the network as data portions 1 150$_1$ and 1' 150$_2$. Both sets of data meet the request. Each set of data portions 1 150$_1$ and 1' 150$_2$ however, is not equally distant from the newly requested host 410. Portion 1 150$_1$ located at node 270 is considerably closer to the host 410 than data portion 1' 150$_2$.

According to one embodiment of the invention, the closest set of data portions meeting the requested criteria, in this case 1 150$_1$, moves to the node closest to the requesting host that is capable of storing the requested data. In some cases, that movement may be to the host itself 410 or to the node to which the host 410 accesses the network 260.

Once the requested data portions have shifted their location, in this case data portion 1 150$_1$ shifting to node 260, the remaining data portions possessing the same time stamp are no longer in a position maximizing the separation between each data portion. Each subset of data portions thereafter seeks out, finds, and relocates to a new location so as to maximize its separation from other co-time stamped data portions while maintaining proximity to other data portions of the same data structure. In this example, data portion 1' 150$_2$ relocates to node 240. Data portion 2 150$_3$ finds relocation unnecessary, and data portion 2' 150$_4$ relocates to node 280. Once relocated, the various replicated data portions for that particular time stamp are again in balance with respect to maximum distance from each other.

FIG. 4 also depicts that a new alteration to the portions of data may occur. As the user manipulates the requested data, a new data capture, replication and storage process may be undertaken creating data portion e 420. Again the data portion would be replicated and stored on the network, but as this data portion possesses a new time stamp it would not, in one embodiment of the present invention, be controlled with respect to storage location, by the previously stored data portions.

In other embodiments of the present invention, the newly created data portion 410 may be associated with previous data portions of like structure thus improving efficiency to future access and storage attempts. One skilled in the art will appreciate that the rule set embedded within each data portion can be modified to dictate the behavior of the replicated data portions based on network characteristics and bandwidth capacity.

Figure 5:
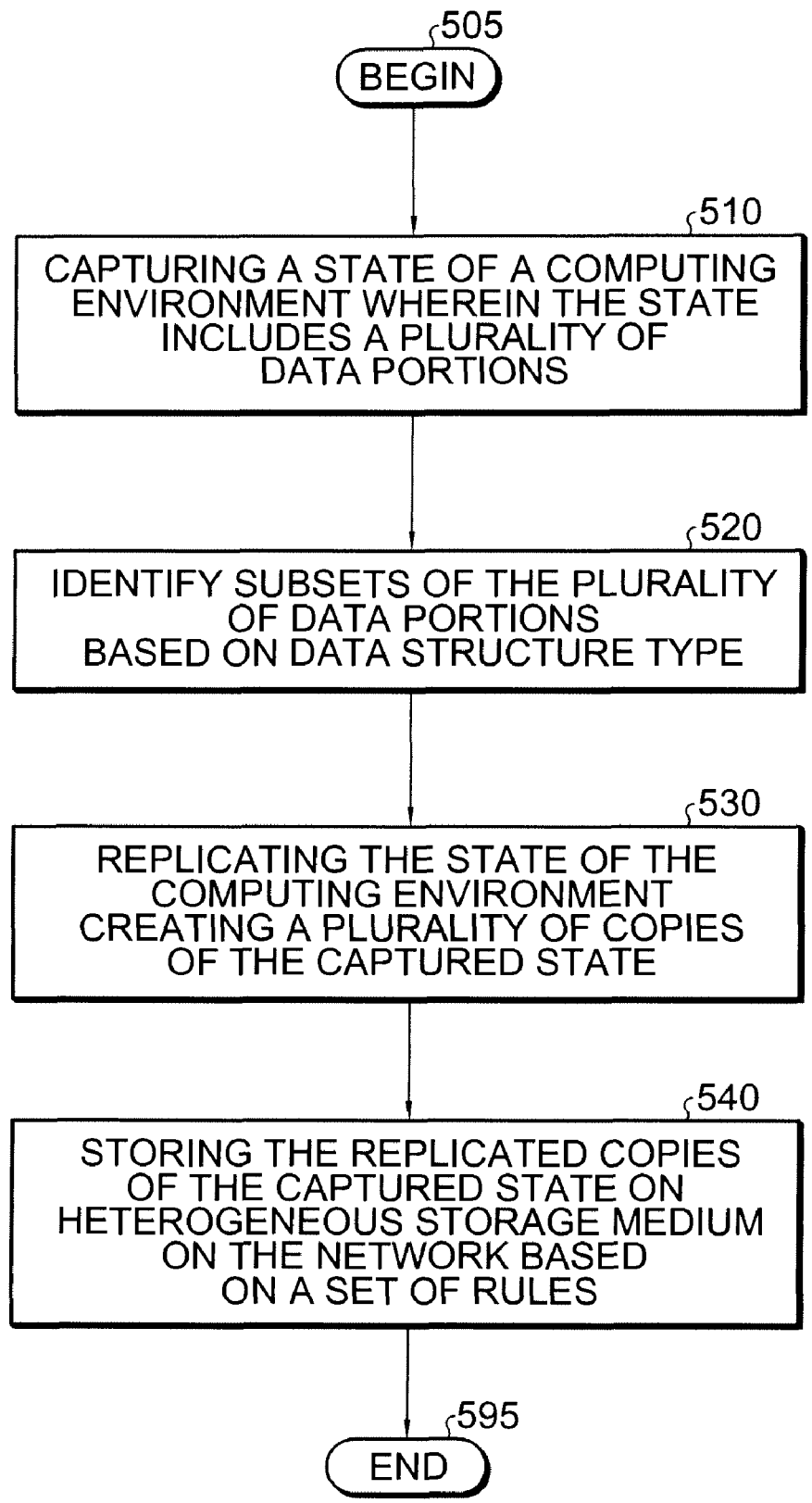
FIG. 5 is a flow chart for one method embodiment for self-organizing data portions in a network, according to the present invention.

FIG. 5 is a flow chart for one method embodiment of capturing and storing data portions of a computing environment on a network in a self-organizing manner, according to the present invention. The method begins 505 with the capturing 510 of a state of a computing environment. As previously described in another embodiment of the present invention, capturing includes identifying 520 the altered portions of the computing environment as compared to a previously captured environment, so as to make efficient use of the storage bandwidth and storage resources.

Once identified 520, the data portions are replicated 530 a plurality of times creating several copies of the altered data. Each data portion within the replicated set of data portions possesses a rule set that directs the data portion to remain proximal with other replicated data portions of the same data structure type while maximizing the separation from other data portions having the same computing state capture time stamp.

Finally the replicated copies of the captured state are stored 540 amongst nodes in a network in a self-organizing fashion based on the rule set possessed within each replicated data portion. While the processing for storing replicated portions of data thereafter ends 595, in other embodiments of the present invention, the location of each of the stored replicated data portions adjusts based on subsequent access to a portion of data from a particular time stamp.

The method illustrated in FIG. 5 shows an exemplary process of self-organizing heterogeneous portions of data in a network environment. In the following description, it will be understood that each portion of the flowchart illustration, and combinations of portions in the flowchart illustration, can be implemented by computer program instructions. These computer program instructions may be loaded onto a computer or other programmable apparatus to produce a machine, such that the instructions which execute on the computer or other programmable apparatus create means for implementing the functions specified in the flowchart portion or portions. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart portion or portions. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart portion or portions.

Accordingly, portions of the flowchart illustration support combinations of means for performing the specified functions and combinations of steps for performing the specified functions. It will also be understood that each portion of the flowchart illustration, and combinations of portions in the flowchart illustrations, can be implemented by special purpose hardware-based computer systems which perform the specified functions or steps, or combinations of special purpose hardware and computer instructions.

These and other implementation methodologies for self-organizing data portions can be successfully utilized by the system 100. These implementation methodologies are known within the art and the specifics of their application within the context of the present invention will be readily apparent to one of ordinary skill in the relevant art in light of this specification.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Furthermore, and as will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A system for capture and storage of a computing environment operating on a node within a network, the system comprising:
   a data capture module residing on the node configured to periodically capture a state of the computing environment wherein the state includes a plurality of data portions and wherein associations between the plurality of data portions are created based on data structure type;
   a replication module configured to replicate the state of the computing environment a plurality of times creating a plurality of copies of replicated data portions;
   a storage module storing the plurality of copies of replicated data portions on a plurality of nodes in the network; and
   a rule set within each of the plurality of data portions directing each data portion to obtain maximum separation in the network from each other data portion copy while maintaining proximity to associated data portions, and wherein the rule set directs a copy of the state of the computing environment to minimize distance between the node and the copy.

2. The system of claim 1 wherein responsive to the node seeking to access at least one of the data portions stored on the network, the at least one of the data portions and all data portions associated with the at least one of the data portions relocate within the network to a location nearest to the node that can contain the at least one of the data portions and all of its associated data portions.

3. The system of claim 2 wherein responsive to relocation of the at least one of the data portions and all data portions associated with the at least one of the data portions, replicas of the at least one of the data portions and all data portions associated with the at least one of the data portions relocate within the network so as to maximize their separation from the at least one of the data portions and all data portions associated with the at least one of the data portions and other replicas.

4. The system of claim 1 wherein each data portion possesses information regarding its association with other data portions and the captured state of the computing environment.

5. The system of claim 1 wherein data structure type includes data files associated with a particular application.

6. The system of claim 1 wherein data structure type includes data execution files.

7. The system of claim 1 further comprising a data portion comparison module configured to compare the state of the computing environment with a previously captured state to identify at least one changed portion of data and wherein only the at least one changed portion of data is replicated by the replication module.

8. The system of claim 1 wherein the replication module resides on another node distinct from the node on which the heterogeneous portions of data were captured.

9. A computer implemented method for storing heterogeneous portions of data on a network, the method comprising:
    capturing at a node of the network a state of a computing environment wherein the state includes a plurality of data portions;
    identifying subsets of the plurality of data portions based on data structure type of the captured data portions;
    replicating the state of the computing environment a plurality of times creating a plurality of copies of the plurality of data portions;
    storing the plurality of copies of replicated data portions on a data storage medium on a plurality of nodes in the network; and
    directing each data portion to obtain maximum separation in the network from each other copy of data portion while simultaneously directing each data portion within each subset of a copy to maintain proximity with each other data portion in that subset of that copy.

10. The method of claim 9 wherein directing is based on a rule set within each of the plurality of data portions.

11. The method of claim 9 wherein responsive to the node seeking to access at least one of the data portions in a subset of data portions stored on the network, relocating the subset of the data portions within the network to a location nearest to the node that can contain the subset of the data portions.

12. The method of claim 11 wherein responsive to relocating the subset of the data portions to the location nearest to the node, relocating other copies of the subset of the data portions within the network so as to maximize their mutual separation.

13. The method of claim 9 wherein each data portion possesses information regarding its association with other data portions and the captured state of the computing environment.

14. The method of claim 9 wherein the data storage medium on the plurality of nodes in the network are heterogeneous.

15. The method of claim 9 wherein only alterations of the state of a computing environment are replicated.

16. The method of claim 9 further comprising comparing the state of the computing environment with a previously captured state, identify at least one changed portion of data, and replicating only the at least one changed portion of data.

17. The method of claim 9 wherein replicating is executed on another node distinct from the node on which the heterogeneous portions of data were captured.

18. A computer-readable storage medium tangibly embodying a program of instructions executable by a machine wherein said program of instruction comprises a plurality of program codes for storing heterogeneous portions of data on a network, said program of instruction comprising:
    program codes for capturing at a node of the network a state of a computing environment of the machine wherein the state includes a plurality of data portions;
    program codes for identifying subsets of the plurality of data portions based on data structure type of the captured data portions;
    program codes for replicating the state of the computing environment a plurality of times creating a plurality of copies of the plurality of data portions;
    program codes for storing the plurality of copies of replicated data portions on a data storage medium on a plurality of nodes in the network; and
    program codes embedded in each data portion for directing each data portion to obtain maximum separation in the network from each other copy of data portion of the same captured computing environment while simultaneously directing each data portion within each subset of a copy to maintain proximity with each other data portion in that subset of that copy.

19. The computer-readable storage medium tangibly embodying a program of instructions of claim 18 wherein the program code for storing directs the plurality of copies of replicated data portions to be stored on heterogeneous data storage media.

20. The computer-readable storage medium tangibly embodying a program of instructions of claim 18 wherein responsive to the node seeking to access at least one of the data portions in a subset of data portions stored on the network, further comprising program code for relocating the subset of the data portions within the network to a location nearest to the node that can contain the subset of the data portions, and program code for relocating other copies of the subset of the data portions within the network so as to maximize their mutual separation.

* * * * *